United States Patent
Reid et al.

(10) Patent No.: US 6,182,226 B1
(45) Date of Patent: Jan. 30, 2001

(54) SYSTEM AND METHOD FOR CONTROLLING INTERACTIONS BETWEEN NETWORKS

(75) Inventors: Irving Reid, Toronto (CA); Spencer Minear, Fridley, MN (US)

(73) Assignee: Secure Computing Corporation, Roseville, MN (US)

(*) Notice: Under 35 U.S.C. 154(b), the term of this patent shall be extended for 0 days.

(21) Appl. No.: 09/040,832

(22) Filed: Mar. 18, 1998

(51) Int. Cl.⁷ .................................................. H04L 9/00
(52) U.S. Cl. ..................... 713/201; 709/225; 709/229
(58) Field of Search .................................. 713/200, 201, 713/202; 707/9; 709/225, 229, 228, 227; 711/163

(56) References Cited

U.S. PATENT DOCUMENTS

| | | | |
|---|---|---|---|
| 3,956,615 | 5/1976 | Anderson et al. | 235/61.7 B |
| 4,104,721 | 8/1978 | Markstein et al. | 364/200 |
| 4,177,510 | 12/1979 | Appell et al. | 364/200 |
| 4,442,484 | 4/1984 | Childs, Jr. et al. | 364/200 |
| 4,584,639 | 4/1986 | Hardy | 364/200 |
| 4,621,321 | 11/1986 | Boebert et al. | 364/200 |
| 4,648,031 | 3/1987 | Jenner | 364/200 |
| 4,701,840 | 10/1987 | Boebert et al. | 364/200 |
| 4,713,753 | 12/1987 | Boebert et al. | 364/200 |
| 4,870,571 | 9/1989 | Frink | 364/200 |
| 4,885,789 | 12/1989 | Burger et al. | 380/25 |
| 4,914,568 | 4/1990 | Kodosky et al. | 364/200 |
| 5,093,914 | 3/1992 | Coplien et al. | 395/700 |
| 5,124,984 | 6/1992 | Engel | 370/94.1 |
| 5,153,918 | 10/1992 | Tuai | 380/25 |
| 5,204,961 | 4/1993 | Barlow | 395/725 |
| 5,228,083 | 7/1993 | Lozowick et al. | 380/9 |
| 5,263,147 | 11/1993 | Francisco et al. | 395/425 |
| 5,272,754 | 12/1993 | Boebert | 380/25 |
| 5,276,735 | 1/1994 | Boebert et al. | 380/21 |
| 5,303,303 | 4/1994 | White | 380/49 |
| 5,305,385 | 4/1994 | Schanning et al. | 380/49 |
| 5,311,593 | 5/1994 | Carmi | 380/23 |
| 5,329,623 | 7/1994 | Smith et al. | 395/275 |
| 5,333,266 | 7/1994 | Boaz et al. | 395/200 |
| 5,355,474 | 10/1994 | Thuraisngham et al. | 395/600 |
| 5,414,833 | 5/1995 | Hershey et al. | 395/575 |

(List continued on next page.)

FOREIGN PATENT DOCUMENTS

| | | | |
|---|---|---|---|
| 0 554 182 A1 | 4/1993 | (EP) | H04L/29/06 |
| 0 743 777 A2 | 11/1996 | (EP) | H04L/29/06 |
| 2287619 | 9/1995 | (GB) | H04L/12/22 |
| 96/13113 | 5/1996 | (WO) | H04L/29/06 |
| 96/35994 | 11/1996 | (WO) | G06F/13/14 |
| 97/13340 | 4/1997 | (WO) | H04L/9/00 |
| 97/26731 | 7/1997 | (WO) | H04L/9/00 |
| 97/26734 | 7/1997 | (WO) | H04L/9/00 |
| 97/26735 | 7/1997 | (WO) | H04L/9/00 |
| 97/29413 | 8/1997 | (WO) . | |

OTHER PUBLICATIONS

Boebert, W.E., et al., "Secure Ada Target: Issues, System Design, and Verification", *Proceedings of the Symposium on Security and Privacy*, Oakland, California, pp. 59–66, (1985).

(List continued on next page.)

*Primary Examiner*—Robert W. Beausoliel, Jr.
*Assistant Examiner*—Christopher Revak
(74) *Attorney, Agent, or Firm*—Schwegman, Lundberg, Woessner & Kluth, P.A.

(57) ABSTRACT

A firewall is used to achieve network separation within a computing system having a plurality of network interfaces. A plurality of regions is defined within the firewall and a set of policies is configured for each of the plurality of regions. The firewall restricts communication to and from each of the plurality of network interfaces in accordance with the set of policies configured for the one of the plurality of regions to which the one of the plurality of network interfaces has been assigned.

32 Claims, 7 Drawing Sheets

U.S. PATENT DOCUMENTS

| | | | |
|---|---|---|---|
| 5,416,842 | 5/1995 | Aziz | 380/30 |
| 5,455,828 | 10/1995 | Zisapel | 370/85.3 |
| 5,485,460 | 1/1996 | Schrier et al. | 370/94.1 |
| 5,511,122 | 4/1996 | Atkinson | 380/25 |
| 5,548,646 | 8/1996 | Aziz et al. | 380/23 |
| 5,550,984 | 8/1996 | Gelb | 395/200.17 |
| 5,566,170 | 10/1996 | Bakke et al. | 370/60 |
| 5,583,940 | 12/1996 | Vidrascu et al. | 380/49 |
| 5,586,260 | 12/1996 | Hu | 395/200.2 |
| 5,604,490 | 2/1997 | Blakley, III et al. | 340/825.31 |
| 5,606,668 | 2/1997 | Shwed | 395/200.11 |
| 5,615,340 | 3/1997 | Dai et al. | 395/200.17 |
| 5,619,648 | 4/1997 | Canale et al. | 395/200.01 |
| 5,623,601 * | 4/1997 | Vu | 713/201 |
| 5,636,371 | 6/1997 | Yu | 395/500 |
| 5,644,571 | 7/1997 | Seaman | 370/401 |
| 5,671,279 | 9/1997 | Elgamal | 380/23 |
| 5,673,322 | 9/1997 | Pepe et al. | 380/49 |
| 5,684,951 | 11/1997 | Goldman et al. | 395/188.01 |
| 5,689,566 | 11/1997 | Nguyen | 380/25 |
| 5,699,513 | 12/1997 | Feigen et al. | 395/187.01 |
| 5,706,507 | 1/1998 | Schloss | 395/615 |
| 5,708,780 | 1/1998 | Levergood et al. | 395/200.12 |
| 5,864,683 * | 1/1999 | Boerbert et al. | 713/201 |
| 5,918,018 * | 6/1999 | Gooderum et al. | 713/200 |
| 5,968,176 * | 10/1999 | Nessett et al. | 713/201 |
| 5,983,350 | 11/1999 | Minear et al. | 713/201 |

OTHER PUBLICATIONS

Boebert, W.E., et al., "Secure Computing: The Secure Ada Target Approach", *Sci. Honeyweller,* 6(2), 17 pages, (1985).

International Search Report, PCT Application No. PCT/US 95/12681, 8 p. (mailed Apr. 9, 1996).

News Release: "100% of Hackers Failed to Break Into One Internet Site Protected by Sidewinder™", Secure Computing Corporation (Feb. 16, 1995).

News Release: "Internet Security System Given 'Product of the Year' Award", Secure Computing Corporation (Mar. 28, 1995).

News Release: "SATAN No Threat to Sidewinder™", Secure Computing Corporation (Apr. 26, 1995).

"Answers to Frequently Asked Questions About Network Security", *Secure Computing Corporation,* p. 1–41 & p. 1–16 (Sep. 25, 1994).

"Sidewinder Internals", Product information, Secure Computing Corporation, 16 p. (Oct. 1994).

"Special Report: Secure Computing Corporation and Network Security", *Computer Select,* 13 p. (Dec. 1995).

Adam. J.A., "Meta–Matrices", *IEEE Spectrum,* p. 26 (Oct. 1992).

Adam, J.A., "Playing on the Net", *IEEE Spectrum,* p. 29 (Oct. 1992).

Ancilotti, P., et al., "Language Features for Access Control", *IEEE Transactions on Software Engineering, SE–9,* 16–25 (Jan. 1983).

Badger, L., et al., "Practical Domain and Type Enforcement for UNIX", *Proceedings of the 1995 IEEE Symposium on Security and Privacy,* p. 66–77 (May 1995).

Belkin, N.J., et al., "Information Filtering and Information Retrieval: Two Sides of the Same Coin?", *Communications of the ACM,* 35, 29–38 (Dec. 1992).

Bellovin, S.M., et al., "Network Firewalls", *IEEE Communications Magazine,* 32, 50–57 (Sep. 1994).

Bevier, W.R., et al., "Connection Policies and Controlled Interference", *Proceedings of the Eighth IEEE Computer Security Foundations Workshop,* Kenmare, Ireland, p. 167–176 (Jun. 13–15, 1995).

Bowen, T.F., et al., "The Datacycle Architecture", *Communications of the ACM,* 35, 71–81 (Dec. 1992).

Bryan, J., "Firewalls For Sale", *BYTE,* 99–100, 102, 104–105 (Apr. 1995).

Cobb, S., "Establishing Firewall Policy", *IEEE,* 198–205 (1996).

Damashek, M., "Gauging Similarity with n–Grams: Language–Independent Categorization of Text", *Science,* 267, 843–848 (Feb. 10, 1995).

Dillaway, B.B., et al., "A Practical Design For A Multilevel Secure Database Management System", *American Institute of Aeronautics and Astronautics, Inc.,* p. 44–57 (Dec. 1986).

Fine, T., et al., "Assuring Distributed Trusted Mach", *Proceedings of the IEEE Computer Society Symposium on Research in Security and Privacy,* p. 206–218 (1993).

Foltz, P.W., et al., "Personalized Information Delivery: An Analysis of Information Filtering Methods", *Communications of the ACM,* 35, 51–60 (Dec. 1992).

Gassman, B., "Internet Security, and Firewalls Protection on the Internet", *IEEE,* 93–107 (1996).

Goldberg, D., et al., "Using Collaborative Filtering to Weave an Information Tapestry", *Communications of the ACM,* 35, 61–70 (Dec. 1992).

Grampp, F.T., "UNIX Operating System Security", *AT&T Bell Laboratories Technical Journal,* 63, 1649–1672 (Oct. 1984).

Greenwald, M., et al., "Designing an Academic Firewall: Policy, Practice, and Experience with SURF", *IEEE,* 79–92 (1996).

Haigh, J.T., et al., "Extending the Noninterference Version of MLS for SAT", *Proceedings of the 1986 IEEE Symposium on Security and Privacy,* Oakland, CA, p. 232–239 (Apr. 7–9, 1986).

Karn, P., et al., "The ESP DES–CBC Transform", Network Working Group, Request for Comment No. 1829, http//ds.internic.net/rfc/rfc1829.txt, 9 p. (Aug. 1995).

Kent, S.T., "Internet Privacy Enhanced Mail", *Communications of the ACM,* 36, 48–60 (Aug. 1993).

Lampson, B.W., et al., "Dynamic Protection Structures", *AFIPS Conference Proceedings,* 35, 1969 Fall Joint Computer Conference, Las Vegas, NV, 27–38 (Nov. 18–20, 1969).

Lee, K.C., et al., "A Framework for Controlling Cooperative Agents", *Computer,* 8–16 (Jul. 1993).

Lodin, S.W., et al., "Firewalls Fend Off Invasions from the Net", *IEEE Spectrum,* 26–34 (Feb. 1998).

Loeb, S., "Architecting Personalized Delivery of Multimedia Information", *Communications of the ACM,* 35, 39–48 (1992).

Loeb, S., et al., "Information Filtering", *Communications of the ACM,* 35, 26–28 (Dec. 1992).

McCarthy, S.P., "Hey Hackers? Secure Computing Says You Can't Break into This Telnet Site", *Computer Select,* 2 p. (Dec. 1995).

Merenbloom, P., "Network 'Fire Walls' Safeguard LAN Data from Outside Intrusion", *Infoworld,* p. 69 & addnl. page (Jul. 25, 1994).

Metzger, P., et al., "IP Authentication using Keyed MD5", Network Working Group, Request for Comments No. 1828, http//ds.internic.net/rfc/rfc1828.txt, 5 p. (Aug. 1995).

Obraczka, K., et al., "Internet Resource Discovery Services", *Computer,* 8–22, (Sep. 1993).

Peterson, L.L., et al., In: *Computer Networks,* Morgan Kaufmann Publishers, Inc., San Francisco, CA, p. 218–221, 284–286 (1996).

Press, L., "The Net: Progress and Opportunity", *Communications of the ACM,* 35, 21–25 (Dec. 1992).

Schroeder, M.D., et al., "A Hardware Architecture for Implementing Protection Rings", *Communications of the ACM,* 15, 157–170 (Mar. 1972).

Schwartz, M.F., "Internet Resource Discovery at the University of Colorado", *Computer,* 25–35 (Sep. 1993).

Smith, R.E., "Constructing a High Assurance Mail Guard", Secure Computing Corporation (Appeared in the Proceedings of the National Computer Security Conference), 7 p. (1994).

Smith, R.E., "Sidewinder: Defense in Depth Using Type Enforcement", *International Journal of Network Management,* p. 219–229 (Jul.–Aug. 1995).

Stadnyk, I., et al., "Modeling User's Interests in Information Filters", *Communications of the ACM,* 35, 49–50 (Dec. 1992).

Stempel, S., "IpAccess—An Internet Service Access System for Firewall Installations", *IEEE,* 31–41 (1995).

Stevens, C., "Automating the Creation of Information Filters", *Communications of the ACM,* 35, 48 (Dec. 1992).

Thomsen, D., "Type Enforcement: The New Security Model", *SPIE,* 2617, 143–150 (1995).

Warrier, U.S., et al., "A Platform for Heterogeneous Interconnection Network Management", *IEEE Journal on Selected Areas in Communications,* 8, 119–126 (Jan. 1990).

White, L.J., et al., "A Firewall Concept for Both Control-Flow and Data-Flow in Regression Integration Testing", *IEEE,* 262–271 (1992).

Wolfe, A., "Honeywell Builds Hardware for Computer Security", *Electronics,* 14–15 (Sep. 2, 1985).

\* cited by examiner

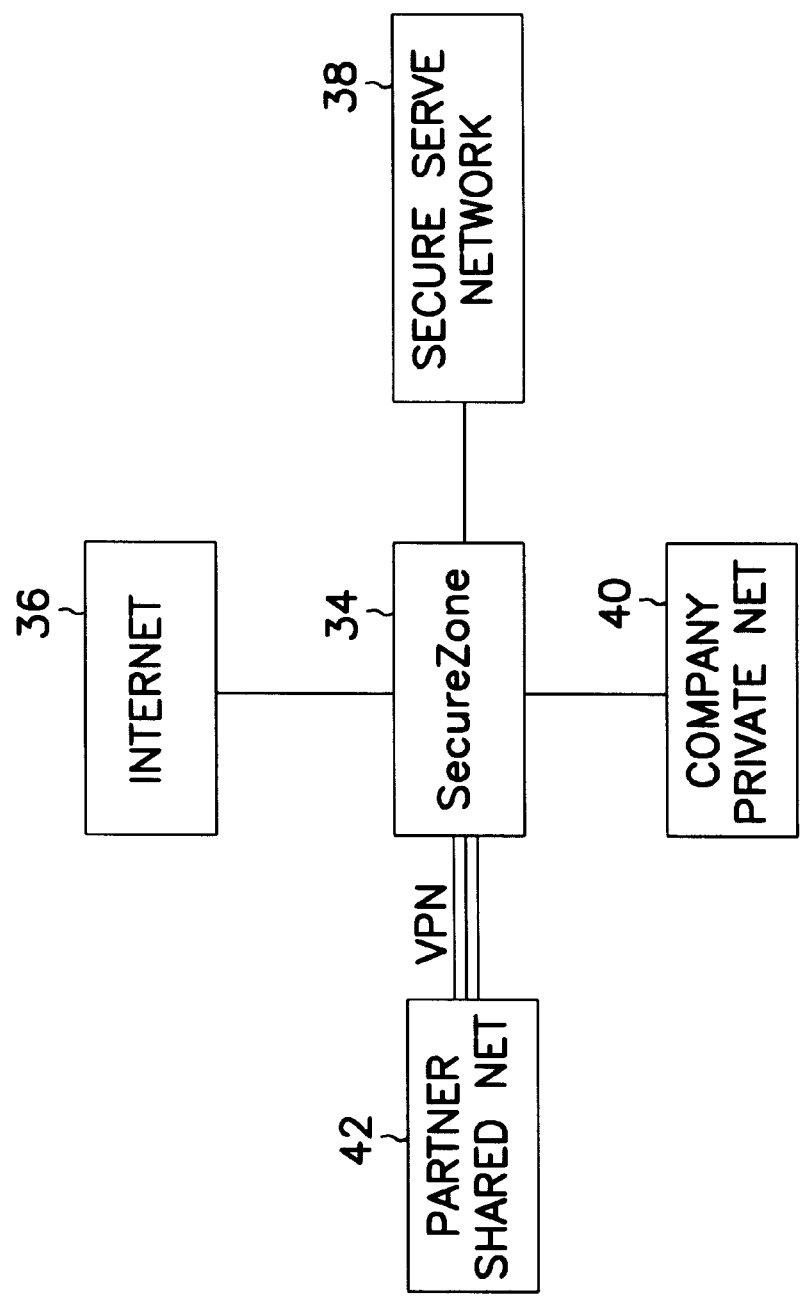

SYSTEM AND METHOD FOR CONTROLLING INTERACTIONS BETWEEN NETWORKS

FIELD OF THE INVENTION

The present invention relates generally to network security, and more particularly to a system and method of grouping networks to enforce a security policy.

BACKGROUND OF THE INVENTION

Recent developments in technology have made access easier to publicly available computer networks, such as the Internet. Organizations are increasingly turning to external networks such as the Internet to foster communication between employees, suppliers and clients. With this increased access comes an increased vulnerability to malicious activities on the part of both people inside and outside the organization. Firewalls have become a key tool in controlling the flow of data between internal networks and these external networks.

A firewall is a system which enforces a security policy on communication traffic entering and leaving an internal network. Firewalls are generally developed on one or more of three models: the screening router, the bastion host, and the dual homed gateway. These models are described in U.S. Pat. No. 5,623,601 to Vu, issued Apr. 22, 1997 and entitled APPARATUS AND METHOD FOR PROVIDING A SECURE GATEWAY FOR COMMUNICATION AND DATA EXCHANGES BETWEEN NETWORKS (Vu), which is hereby incorporated herein by reference.

Vu describes packet filters as a more sophisticated type of screening that operates on the protocol level. Packet filters are generally host-based applications which permit certain communications over predefined ports. Packet filters may have associated rule bases and operate on the principle of that which is not expressly permitted is prohibited. Public networks such as the Internet operate in TCP/IP protocol. A UNIX operating system running TCP/IP has a capacity of 64 K communication ports. It is therefore generally considered impractical to construct and maintain a comprehensive rule base for a packet filter application. Besides, packet filtering is implemented using the simple Internet Protocol (IP) packet filtering mechanisms which are not regarded as being robust enough to permit the implementation of an adequate level of protection. The principal drawback of packet filters, according to Vu, is that they are executed by the operating system kernel and there is a limited capacity at that level to perform screening functions. As noted above, protocols may be piggybacked to either bypass or fool packet filtering mechanisms and may permit skilled intruders to access the private network.

Accordingly, it is an object of this invention is to provide a method for controlling interactions between networks by the use of firewalls with defined regions.

SUMMARY OF THE INVENTION

The present invention is directed to a system and method of achieving network separation within a computing system having a plurality of network interfaces. One aspect of the invention is a method comprising the steps of defining a plurality of regions; configuring a set of policies for each of the plurality of regions; assigning each of the plurality of network interfaces to only one of the plurality of regions, wherein at least one of the plurality of network interfaces is assigned to a particular region; and restricting communication to and from each of the plurality of network interfaces in accordance with the set of policies configured for the one of the plurality of regions to which the one of the plurality of network interfaces has been assigned.

Another aspect of the invention is a secure server comprising an operating system kernel; a plurality of network interfaces which communicate with the operating system kernel; and a firewall comprising a plurality of regions, wherein a set of policies have been configured for each of the plurality of regions; wherein each of the plurality of network interfaces is assigned to only one of the plurality of regions; wherein at least one of the plurality of network interfaces is assigned to a particular region; and wherein communication to and from each of the plurality of network interfaces is restricted in accordance with the set of policies configured for the one of the plurality of regions to which the one of the plurality of network interfaces has been assigned.

A feature of the present invention is the application level approach to security enforcement, wherein type enforcement is integral to the operating system. Still another feature is protection against attacks including intruders into the computer system. Yet another feature is a new graphical user interface (GUI) in effective Access Control Language (ACL). A further feature of the present invention is a visual access control system. Another feature is embedded support for Virtual Private Networking (VPN).

BRIEF DESCRIPTION OF THE DRAWINGS

FIG. 1 depicts an implementation of the firewall of the present invention.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

FIG. 1 depicts a block diagram showing the relationship between a firewall 34 in accordance with this invention, the Internet 36, a Secure Server Network (SSN) 38, a Company Private Net 40, and a Partner Shared Net 42. As shown in FIG. 1, communications to and from any other servers or networks goes through the firewall 34.

Figure 1A:
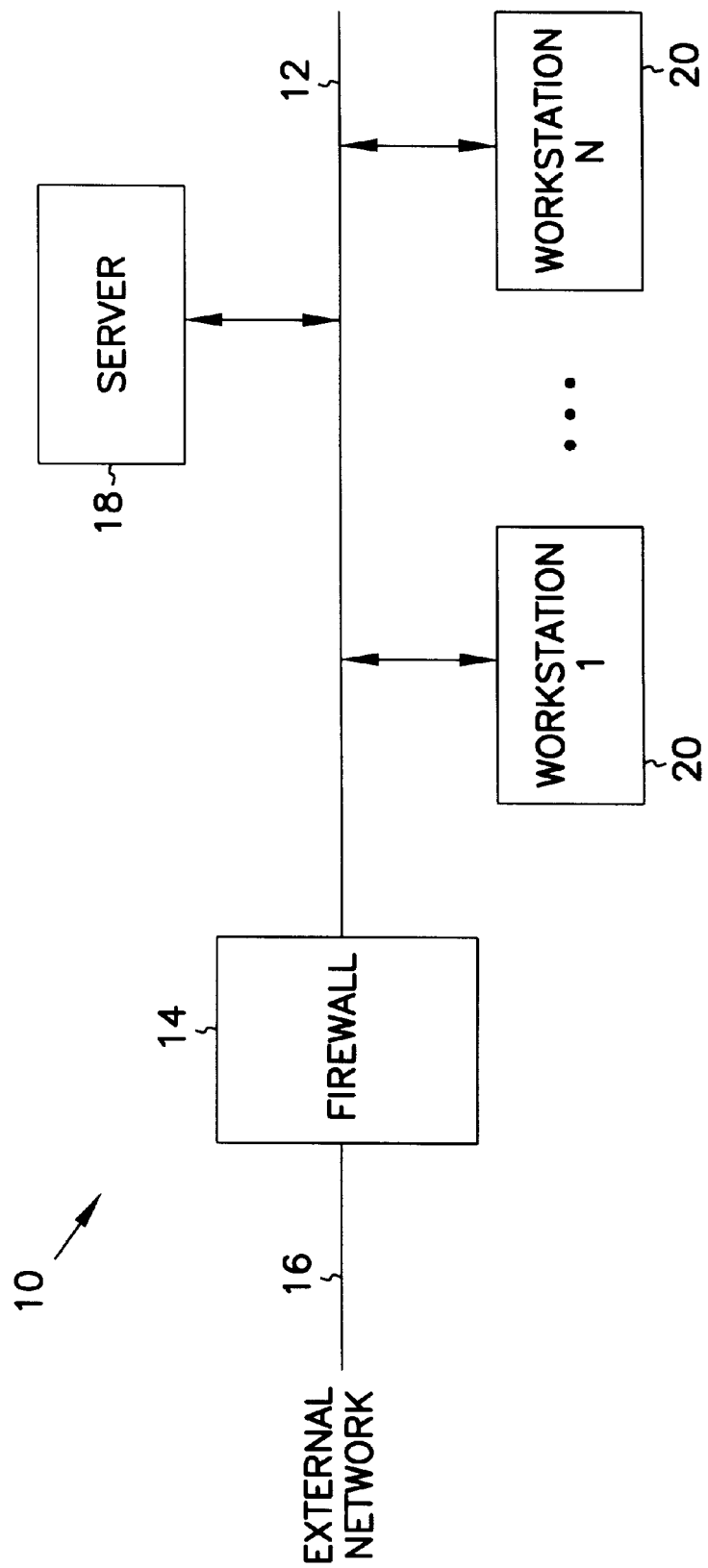
FIG. 1a shows a representative computing system protected by a firewall.
Figure 1B:
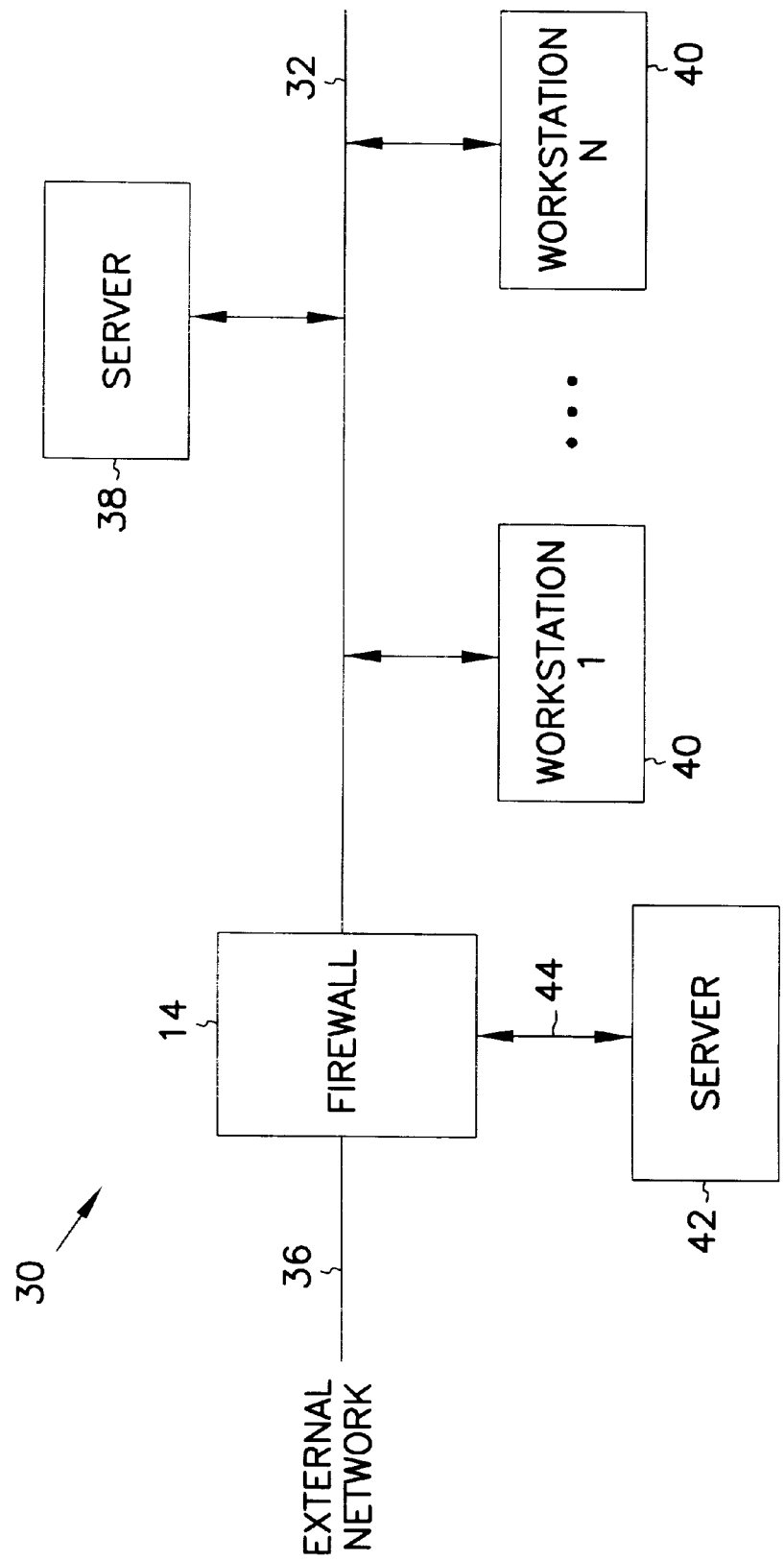
FIG. 1b depicts another computing system protected by a firewall.

Two representative firewall-protected computing systems are shown in FIGS. 1a and 1b. System 10 in FIG. 1a includes an internal network 12 connected through firewall 14 to external network 16. A server 18 and one or more workstations 20 are connected to internal network 12 and communicate through firewall 14 with servers or workstations on external network 16.

System 30 in FIG. 1b includes an internal network 32 connected through firewall 34 to external network 36. A server 38 and one or more workstations 40 are connected to internal network 32. In addition, a server 42 is connected through network 44 to firewall 34. Workstations 40 communicate through firewall 34 with servers or workstations on external network 36 and with server 42 on network 44. In one embodiment network 44 and server 42 are in a sort of demilitarized zone (DMZ) providing protected access to server 42 to internal users and to external entities.

In one embodiment, firewalls 14 and 34 implement a region-based security system as will be discussed below.

The operating system on which the firewall 34 is implemented is the BSDI 3.1 version of UNIX, a security hardened operating system with each application separated out, and protected by type enforcement technology. The functions of firewall 34 are all integrated with the operating system, and each one is completely compartmentalized and secured on its own, and then bound by type enforcement control.

Type enforcement, which is implemented within the operating system itself, assures a very high level of security by dividing the entire firewall into domains and file types. Domains are restricted environments for applications, such as FTP and Telnet. A domain is set up to handle one kind of application only, and that application runs solely in its own domain. File types are named groups of files and subdirectories. A type can include any number of files, but each file on the system belongs to only one type.

There is no concept of a root super-user with overall control. Type enforcement is based on the security principle of least privilege: any program executing on the system is given only the resources and privileges it needs to accomplish its tasks. On the firewall of this invention, type enforcement enforces the least privilege concept by controlling all the interactions between domains and file types. Domains must have explicit permission to access specific file types, communicate with other domains, or access system functions. Any attempts to the contrary fail as if the files did not exist. The type enforcement policy is mandatory, and nothing short of shutting the system down and recompiling the type enforcement policy database can change it.

Type enforcement is described in two pending patent applications entitled SYSTEM AND METHOD FOR PROVIDING SECURE INTERNETWORK SERVICES, Ser. No. 08/322,078, filed Oct. 12, 1994, and SYSTEM AND METHOD FOR ACHIEVING NETWORK SEPARATION, Ser. No. 08/599,232, filed Feb. 9, 1996, both of which are incorporated herein by reference. Essentially, a type enforcement scheme provides for the secure transfer of data between a workstation connected to a private network and a remote computer connected to an unsecured network. A secure computer is inserted into the private network to serve as the gateway to the unsecured network and a client subsystem is added to the workstation in order to control the transfer of data from the workstation to the secure computer. The secure computer includes a private network interface connected to the private network, an unsecured network interface connected to the unsecured network, wherein the unsecured network interface includes means for encrypting data to be transferred from the first workstation to the remote computer, a server function for transferring data between the private network interface and the unsecured network interface and a filter function for filtering data transferred between the remote computer and the workstation.

Application-Level Gateway Architecture

The firewall of the present invention features application-level gateways, which negotiate communications and never make a direct connection between two different networks. Hence, unlike packet filtering, which, as described in the prior art, applies rules on every incoming packet of data, the firewall applies rules applicable to the network or port in which data packets are entering. The gateways have a detailed understanding of the networking services they manage. This architecture isolates activity between network interfaces by shutting off all direct communication between them. Instead, application data is transferred in a sanitized form, between the opposite sides of the gateway.

Attack Protection

In addition to the firewall's secured type enforced operating system and application gateway architecture, the system has been designed to defend against known network penetration and denial of service attacks, including:

| | |
|---|---|
| SYN Flood attack | Ping of death (fat ping attack) |
| IP spoofing | Malformed packet attacks (both TCP & UDP) |
| ACK storms | Forged source address packets |
| Network probes | Packet fragmentation attacks |
| Session hijacking | Log overflow attacks |
| SNMP attacks | Log manipulation |
| ICMP broadcast flooding | Source routed packets |
| Land attack | DNS cache corruption |
| ARP attacks | Mail spamming |
| Ghost routing attacks | DNS denial of service |
| Sequence number prediction | FTP bounce or port call attack |
| Buffer overflows | ICMP protocol tunnelling |
| Mail exploits | VPN key generation attacks |
| Authentication race attacks | |

Intruder Response

Finding out who and where attacks are originating from is a key requirement to taking corrective action. The firewall also includes intruder response that allows administrators to obtain all the information available about a potential intruder. If an attack is detected or an alarm is triggered, the intruder response mechanism collects information on the attacker, their source, and the route they are using to reach the system.

In addition to real-time response via pager or SNMP, alarms can be configured to automatically print results or to email them to the designated person.

Regions

The growing need for applying specific security policies and access requirements to complex organizations requires a new way of managing firewalls—regions. Regions are groupings of physical interfaces (network cards) and virtual networks (VPNs) into entities of similar trust.

Figure 2:
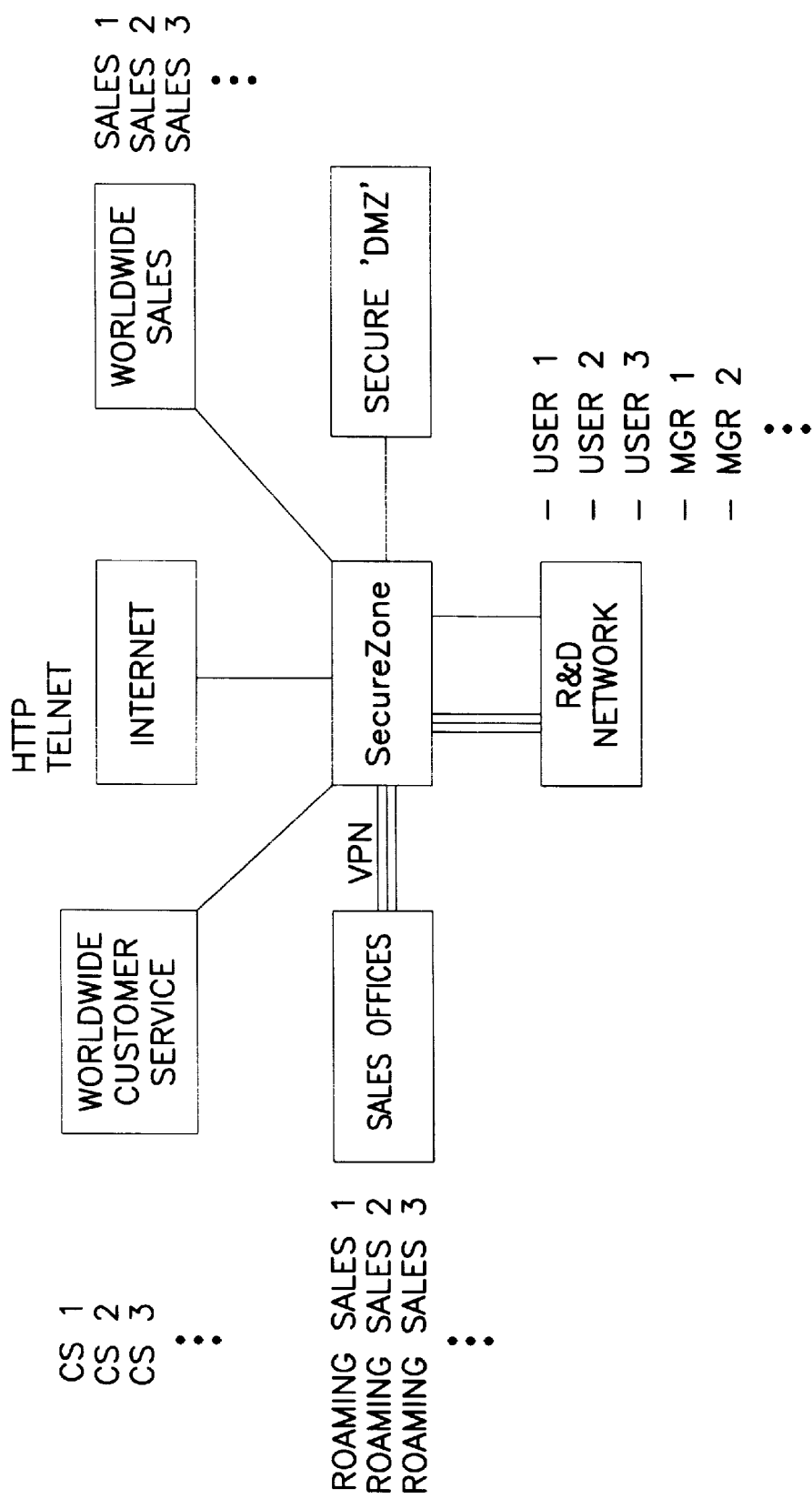
FIG. 2 shows the regions and their members as defined in the present invention.

Suppose a company has thousands of roaming users connecting to the company network from encrypted virtual private network ("VPN") clients—managing such users one at a time would be an enormous task. It would be easier to organize those roaming users into groups having, as an example, full access, medium access, and limited access rights. FIG. 2 depicts regions Internet, Secure 'DMZ', R&D Network, Sales Offices, Worldwide Customer Service, and Worldwide Sales. In FIG. 2, all Sales or Customer Support departments in the company's offices can be grouped together into regions Worldwide Sales and Worldwide Customer Service, respectively.

Regions permit the grouping of networks and VPNs that require the same type of security, thereby eliminating the need to enter multiple versions of the same access rule for each network or VPN. Thus regions allow flexibility in tailoring a security policy. In defining regions, the first task is to group together networks or VPNs that require the same type of network access. Each network interface card or VPN that is grouped in a region is considered a member of that region. A region can consist of the following members:

an interface card, a VPN, a group of VPNs, an interface card and a VPN, or an interface card and a group of VPNs.

Hence in FIG. 2, user1, user2, user3, mgr1, and mgr2 of Region named R&D Network would have the same rights defined for the R&D Region. In the same way, Roaming Sales 1, Roaming Sales 2, Roaming Sales 3, etc. would have the same rights accorded to all members of Region named Sales Offices. In FIG. 2, user1, user2, Roaming Sales 1, Roaming Sales 2, mgr1, etc., do not necessarily represent only workstations. In other words, it is possible for user2 to logon the workstation onto which user3 might ordinarily logon, or for mgr1 to logon the workstation onto which mgr3 might ordinarily logon.

Access Rules/Access Control Language

A discussion of the use of access control language to define a security policy is explained in greater detail by Reid et al. in SYSTEM AND METHOD FOR IMPLEMENTING A SECURITY POLICY, U.S. patent application Ser. No. 09/040,827, filed herewith, which discussion is hereby incorporated by reference.

Every region is protected from every other region as defined in the firewall of the present invention. All connections to and from each region are first examined by the firewall. Regions may communicate with each other only if an appropriate access rule has been defined. For each access rule, first, the services that the rule will control must be defined, then, second, the regions that the connection is traveling between must also be defined. For example, if the Internal region is to be allowed to access Telnet services on the Internet region, the access rule must specify Telnet as the service that the rule controls and specify the From: region as Internal and the To: region as Internet. Hence, the firewall of the present invention does not allow traffic to pass directly through the firewall in any direction. Region to Region connections are made via an application aware gateway. Application-level gateways understand and interpret network protocol and provide increased access control ability.

The ACLs are the heart and soul of the firewall. For each connection attempt, the firewall checks the ACLs for permissions on use and for constraints for the connection. Constraints can include: encryption requirements, authentication requirements, time of day restrictions, concurrent sessions restrictions, connection redirection, address or host name restrictions, user restrictions and so forth.

Access rules are the way in which the firewall protects regions from unauthorized access. For each connection attempt, the firewall checks it against the defined access rules. The rule that matches the characteristics of the connection request is used to determine whether the connection should be allowed or denied.

With the firewall of the present invention, access rules are created in a completely new way—using decision trees. Knowing that an access rule is based on a series of decisions made about a connection, the firewall permits the building of an access rule based on "nodes" of decision criteria. A node can be added to check for such criteria as the time of day, whether the connection uses the appropriate authentication or encryption, the user or groups initiating the connection request or the IP address or host of the connection. Each node is compared against an incoming connection request and you determine whether the connection is allowed or denied based on the results of the node comparison.

Every access rule must consist of two specific nodes. The first, the Services node, decides which service(s) the rule will control. The second, the From/To node determines the source region and destination region of the connection. Once the services and regions for the rule are established, more nodes can be added to determine specific details about the connection.

In addition to the Allow or Deny terminal nodes, there are four other types of nodes you can add to an access rule: decision nodes, filter nodes, redirects or address rewrites, and alerts.

Decision Nodes

At any point in an access rule, a connection request can be checked based on the time of day, its users and groups, its IP addresses and hosts or maximum concurrent sessions. At these decision nodes, the firewall determines whether the connection is true or false. If the connection meets the criteria listed in the node, the connection is considered true and proceeds along a "true" branch. If the connection does not meet the node criteria, the connection is considered false and proceeds along a "false" branch.

Filter Nodes

At any point in an access rule one can check whether a connection has certain authentication or encryption, use SmartFilter to block particular WWW connections, or filter the connection to see if it contains Java or ActiveX content. Filters differ from decision nodes in that they do not determine whether a connection is true or false. Instead, filters attempt to apply a condition to the connection. If the filter can be applied to the connection, the filter is performed and the connection proceeds along the same path. If the filter does not apply to the connection, the filter is ignored and the connection still proceeds.

Redirects or Address Rewrites

A rewrite node is a point in an access rule where source or destination addresses are mapped to other source or destination addresses. Destination IP address rewrites allow an inbound connection through network address translation (NAT) address hiding to be remapped to a destination inside the NAT barrier. Source address rewrites can be used on outbound connections to make the source appear to be one of many external addresses. This process allows the internal hosts to be aliased to external addresses. Rewrites can be based on any connection criteria, including users.

Alerts

At any point in an access rule, one can add an alert that notifies recipients when a connection has reached a particular point in an access rule. Using these alerts, one can monitor specific users, IP addresses and other criteria contained within a specific access rule.

True and False Branches

When a connection request reaches a node in a rule, it is checked against the information in the node. If the connection is a filter node, the filter condition is either applied or ignored. Only one branch leads out of a filter node. If the node happens to be a decision node, there are two possible results. If the connection meets the criteria listed, it is considered true and follows the "true" branch of the access rule. Otherwise, the connection is considered "false" and follows the false branch.

Figure 3:
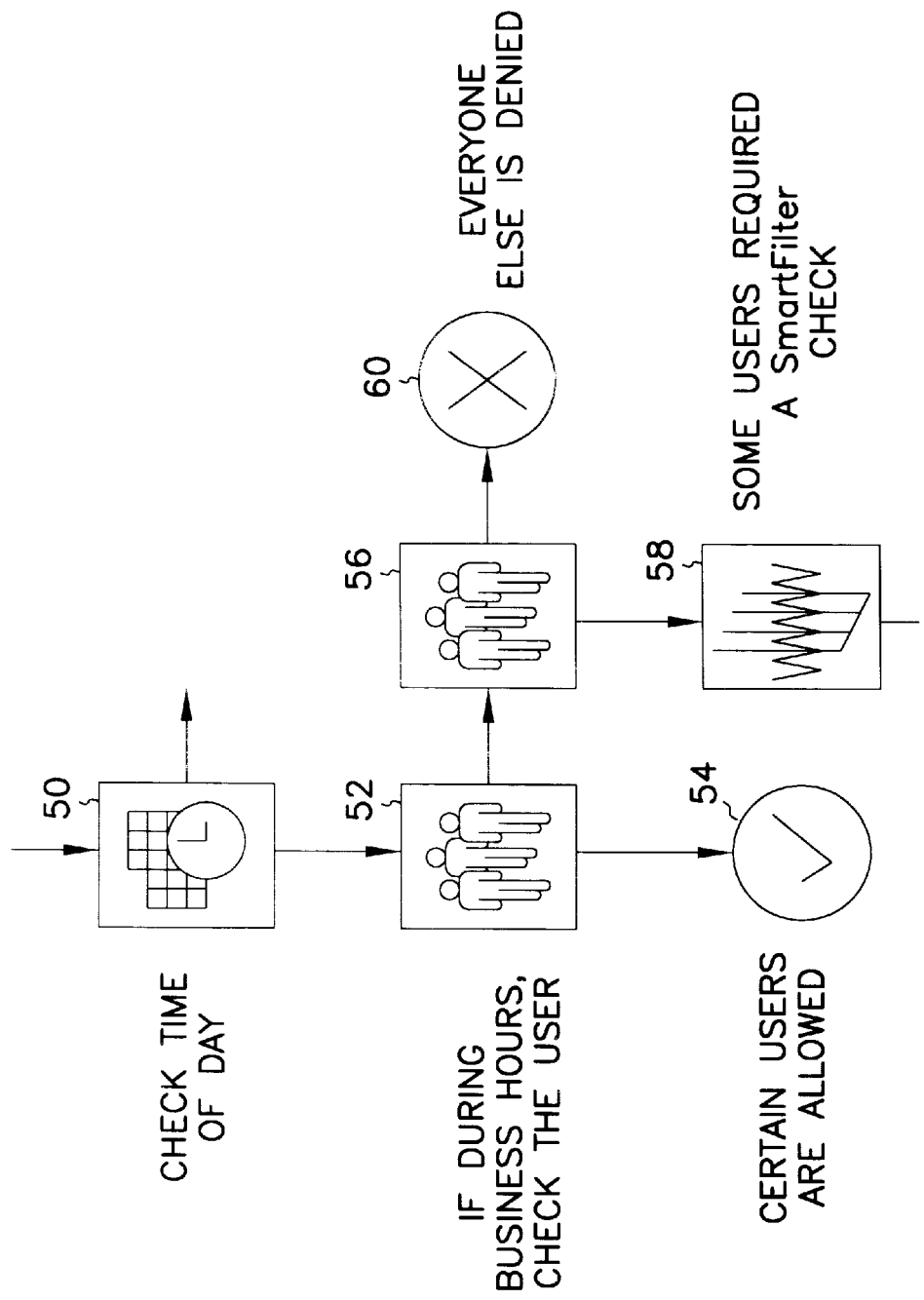
FIG. 3 is a graphical representation of ACL commands.

Referring to FIG. 3, the design for this feature falls almost directly out of the GUI representation. The GUI presents access rules as a decision tree with special kinds of nodes which make true or false decisions. Each decision leads to a branch which contains more nodes. Along the way, filters can be acquired. These filters are not processed by the kernel with the exception of redirects (rewrite destination address or port). In FIG. 3, the time of day is checked (50). If during business hours, the user is checked (52). Certain users are allowed, so connection is allowed (54) as indicated by the check mark. However, some users (56) require a SmartFilter check (58), whereas everyone else is denied (60).

The firewall of the present invention introduces a revolutionary means to manage network access control. Traditional firewalls provide lists of access control rules, but as more rules and controls are added, these lists become unmanageable. As shown in FIG. 3, the present invention presents a visual means by which access control can be defined and easily understood through flowchart style diagrams.

The firewall's access flow diagrams allow any decision criteria to be based on any other decision, in any order. If the administrator wants to check user first, then time, then apply a specific access policy, they can. In addition, the flow diagrams are object oriented for greater power.

Access control rules on the firewall can be defined with flexibility previously unknown in the industry. This allows, for example, for different web filtering polices on a per-user basis, the ability to deny a connection if it isn't encrypted, authenticate a connection by strong token and another connection by password. Access rules can incorporate any of the following criteria:

Source and destination Region

Users and groups

Source and destination addresses, networks, hosts, and domains

Type of service (WWW, Email, Telnet, FTP, etc.)

Time of day, Day of week

Load balancing

Maximum number of concurrent sessions

Required level of encryption

Required level of authentication (strong token, password, etc.)

Protocol filters (WWW, FTP—see later in this section)

SmartFilter™ URL blocking policy (see later in this section)

Multiple external IP address connected to

Source and destination service port and IP address rewrites

Address and Port Rewrites

The firewall's access control diagrams include the capability of IP address rewrites, which allows a connection inbound through NAT address hiding to be remapped to a destination inside the NAT barrier. Also, rewrites can be used on outbound connections to make the source appear to be one of many external addresses. This allows internal hosts to be aliased to external addresses.

Rewrites can be based on any connection criteria, including users. So the administrator can have anonymous FTP connections directed to a public access FTP server on the Secure Server Net, but remap users to their internal machines.

User Defined Alerts

Figure 4:
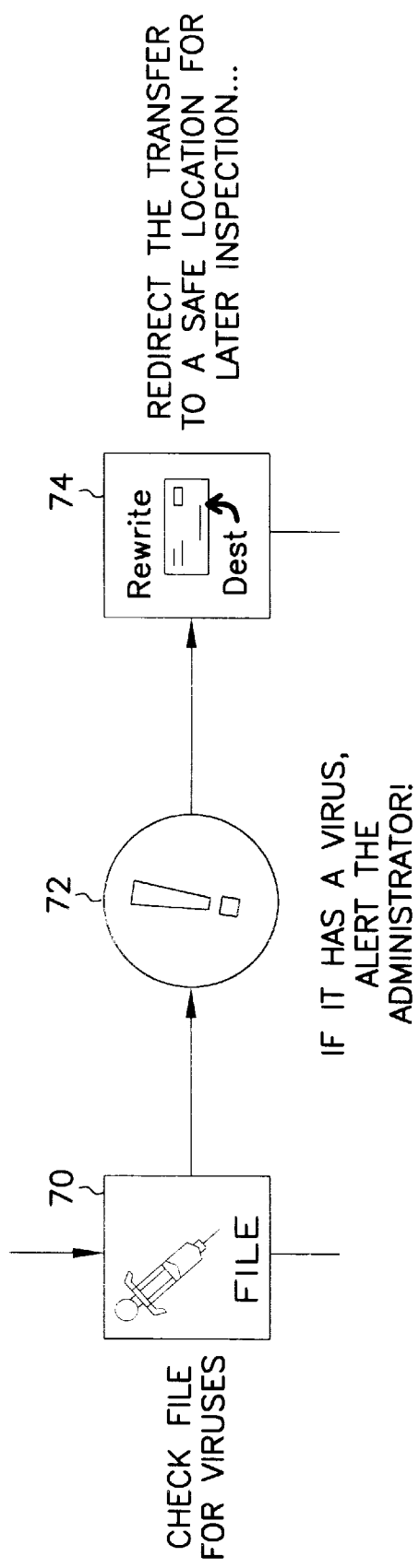
FIG. 4 is a flow diagram for a virus alert.

The firewall's access control diagrams also include the capability of sending alerts, with an administrator-defined message, based on any connection decision. Alerts can be dropped into the access flow diagrams at any point. If a connection reaches that point in the diagram, the alert is triggered. For example, in FIG. 4, a check for viruses is performed on a file (70). If a virus is found, the administrator is alerted (72), and the transfer is redirected to a safe location for later inspection (74).

The ACLs consist of all the required kernel code. This is all the code that implements the rules themselves in the kernel including: build, modifying, deleting, and querying the rules. Also included are the system calls that the user level programs need to use the ACLs. The parsing of the return values, especially the filters are not part of the ACLs themselves since the filter rules are defined dynamically by the programs issuing the system calls to build the ACLs. It is the intent that the kernel be flexible enough to handle all the filter requirements without needing modifications for future enhancements.

The ACLs themselves must satisfy the requirements laid out by the GUI design. This dictates to a large degree how the rules must be implemented. Since the user has no direct access to the ACLs (rather they use the user interface), there are no ease of use concerns here except to say that the ACLs must be something the developers can work with easily. Hence, there exists a good set of tools to debug the ACLs.

Virtual Private Networking

Virtual Private Networking (VPN) has been embedded into the architecture of the firewall of the present invention, making it an operating characteristic of the operating system, as opposed to other firewalls which added VPN later. Every access control is available to VPN connections in exactly the same way as for physically connected networks: user controls, IP restrictions, protocol filters, address hiding, multi-homing, and more. VPN is a method of authenticating and transparently encrypting bi-directional data transmissions via the Internet. Both gateway to gateway network links as well as roaming users on VPN enabled laptops are utilizing the security and cost effectiveness of VPN Internet encrypted communications. VPN technology is embedded in the core design of the firewall of the present invention.

Proxies

There are usually 2 sockets per session, client_sock and server_sock. Each socket has two endpoints, so there can be up to four different IP addresses. Note that loc_dst_addr could be anything, if the firewall bound to a wildcard address. Here are diagrams for BFS Inbound, BFS Outbound, and the firewall of the present invention.

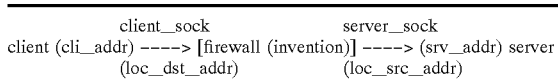

Proxy Signals

The SIGWINCH signal is used to force all ACLs to be rechecked and for proxies to re-initialize themselves (for proxies that use config files). Most proxies will handle this signal themselves, but if secured did an ACL before starting a proxy, it must also do the recheck. The SIGWINCH signal will come from the backend, which will use killpg() to signal all the inetd daemons, secured processes, and their child proxies or servers. Note that the default action for SIGWINCH is ignore, so inetd did not need to be modified.

Some transient proxies use the SIGALRM internally to do idle proxy timeouts (tcpgsp, tnauthp, sqlp).

All proxies should shutdown cleanly if given a SIGTERM signal. The backend (daemond actually) uses SIGTERM to kill inetd processes when the last service has been removed. We have modified inetd to catch SIGTERM and then use killpg(SIGTERM, pgid) to kill all its children (proxies and secureds). When it starts up, inetd creates a new process group and becomes the leader, which allows it to kill all children easily.

Squid will re-open (not rotate) its logfiles if given the SIGUSR1 signal, and re-initialize itself if given SIGWINCH or SIGHUP. Note that this means squid does not do ACL rechecks, it treats itjust like a SIGHUP—closes its listen sockets and waits 30 seconds for active sessions to terminate, then re-opens listen sockets. This easy way out was chosen because squid's connections are relatively short-lived.

Standard Proxy Options

The following options are passed to secured by the backend writing them on the inetd.conf line:
-D te_dom Set the TE domain of our child process to te_dom
-N service_number the service number is required for ACL calls.
secured will pass this number on to all proxies
-t Specifies that secured is running a transient service (with the wait flag in inetd.conf). ACL checks are not done by secured for transient services, because the service itself must do ACL checks.
-u Specifies that this service supports the notion of a user name, so secured should let service perform its own ACL checks. Currently only FTP, telnet and WWW support user names. Note: only needed for ftpp, because tnauthp and squid already do their own ACLs.

The following options are passed to a proxy by the backend writing them on the inetd.conf line:
-a audit_name use 'name' in call to openlog() and for auditing
-i N specify session idle timeout as N seconds
-I N specify proxy idle timeout as N seconds (transient only)
-P ch specify descriptor port, ch=S for secure, ch=L for lpr, ch=G for generic, otherwise, ch=N specify fixed port, or ch=low-high to specify a port range The following ACL return values are passed to short-lived proxies by secured:
-N service_number the same service number that secured got via backend
-c cli_rgn set cli_region
-s srv_rgn set srv_region
-D IP specify the server IP address
-M IP specify an IP address to spoof as loc_src_addr, for MAT-out
-p N specify the server port number
-P N specify fixed value for descriptor port
-C spoof client-side socket (typically outbound proxies)
-S spoof server-side socket (typically inbound proxies)

By letting the ACLs control so many settings, the inetd.conf lines are much simpler and the degree of control is much greater. For example, here are some BFS inetd.conf entries for inbound proxies:
inbound_udp_relay -e 199.71.190.101 -w 65546 -u g_udp_ir -d 192.168.128.138 -m -g 0
secured -ws 144 -wr 1 -wn 1 -1 199.71.190.121 www_X www_r_i . . . d 192.168.125.2 -m Here are the corresponding entries for the firewall of the present invention:
secured -N 123 -D RGnx -t - ntpp -a ntpp
secured -N 456 -D RGnx -t - httpp -a httpp The following options are only used for debugging purposes, some might be disabled on production systems or supported in future releases:
-n non-transparent proxy mode—only works for VDO-Live
-U user_name set the user name (ftp ftp_mux and ftpp/ftpd)
-A ch set the audit method, ch=s for syslog, ch=a for audit, ch=e for stderr
-m disable socket mating
-L disable connection logging
-z set non-paranoid mode, which relaxes IP address checks for UDP proxies

Audit Issues

The firewall of the present invention uses new structured audit calls for session logging, which include src and dst region, ACL matched, auth method, encryption state, etc. The new calls are:
audit_session_begin
audit_session_continue
audit_session_end
audit_log_ftp—to log FTP file transfers, includes user, filename, size
audit_log_smartfilter—to log URL, action (allow/deny), blocked categories
audit_acl_deny—to log ACL denials
audit_ipsec_fail—to log IPSEC failures
audit_auth_fail—to log authentication failures

Authentication Issues

SecureZone has incorporated the proxy-warder-interface (pwif) from Sidewinder. We also support external authentication servers such as snk, safeword, securid. The pwif interface was already supported by tnauthp, we added pwif support to ftpp, and for GUI login. We are not using pwif for squid, instead we are using their build-in passwd file support. The backend will have to keep the squid passwd file in sync with the static-passwd file used for ftp and telnet.

ACL Issues

Besides a simple allow/deny, the ACLs also return the following: from_region, to_region, destination redirects for IP and port, source redirects for IP and port, transparency settings and filters. We have standardized ACL filters as follows (example from acl_util.h):

```
#define FILT_DELIM        '|'
/*
 * all filters will be at least 3-characters in length
 * proxy ACL filters will all start with "p"
 * all filters should be disabled (0) by unless ACLs enable them
 */
/* generic proxy filters - all start with "pg" */
 *
 * filt_debug          filter "pgdN" sets debug level to N
 *
 * filt_crypto_from    filter "pgeR:levels" requires encryption in regions R,
 * filt_crypto_to      where R equals F, T, B for from_rgn, to_rgn, both,
 * filt_crypto_levels  and levels is colon delimited in "rc4–40:rc4–128:des56:3des"
 *                     For example, pgeF:rc4–128:3des" would force strong
 *                     encryption between the client and the firewall
 *
 * filt_loc_auth       filter "pgaX" specifies local auth
 *                     the character X gives the method: S, s, w
 *                     for STRONG_ONLY, STRONG_PREFER, WEAK_PREFER
 *
 * filt_rem_auth       TRUE or FALSE
 * filt_undef_servers  filter "pgA:" specifies list of remote auth methods,
 *                     colon delimited "pgA:radius:safeword:securid:snk"
 */
typedef struct {
    /* generic proxy filters - see above for their defined values */
    char filt_debug;
    char filt_crypto_from;
    char filt_crypto_to;
    int filt_crypto_levels;
    char filt_loc_auth;
    char filt_rem_auth;
    char **filt_undef_servers;
    /* FTP proxy filters - all start with "pf" */
    char filt_port;    /* filter "pfo" disables PORT command */
    char filt_pasv;    /* filter "pfa" disables PASV command */
    char filt_get;     /* fllter "pfg" disables RETR command */
    char filt_put;     /* filter "pfp" disables STOR command */
    char filt_site;    /* filter "pfs" disables SITE command */
    char filt_mkdir;   /* filter "pfm" disables MKD command */
    char filt_rmdir;   /* filter "pfr" disables RMD command */
    char filt_delete;  /* filter "pfd" disables DELB command */
    char filt_rename;  /* filter "pfv" disables RNFR & RNTO commands */
    char filt_anon;      /* filter "pff" disables USER ftp and anonymous
*/
    u_long filt_size;  /* filter "pfsN" sets N KB to max file size */
} ftp_acl_filter_t;
```

Here are some example filter strings, from acl_load.c:

```
    /* FTP: site, del, WWW: java, activex, cookies */
#define FILTER_STR1 "pfs|pfd|pwj|pwa|pwc|"
    /* generic filter: debug=3 */
#define FILTER_STR2 "pgd3|"
    /* debug = 2, FTP: 69K, strong auth, with external auth servers */
#define FILTER_STR3 "pgd2|pfS69|pgaS|pgA:safeword:radius|"
```

SQUID Issues

The caching WWW proxy (squid) is very interesting because it has its own ACL checks and non-blocking DNS interface. We leveraged this built-in support in our work, but it was still tricky to integrate the firewall's ACL calls while operating as a non-blocking long-lived proxy.

Squid supports something called proxy-authentication, but this will only work if someone has configured their web browser to contact a proxy for all URLs. Before doing ACL checks, we use the following code to handle this special case:

```
if(scc_getregion(&conn–;>me.sin_addr) == 0)
    name_valid = 1;    /* non-transparent mode supports proxy-auth */
else
    name_valid = 0;    /* transparent mode does not */
```

This will cause ACL checks for transparent HTTP requests to bypass user nodes, and squid will ignore auth filters. Non-transparent requests (where the connection is TO the firewall) will enforce any user nodes and auth filters in the ACL tree.

Since the proxy might not get an authentication filter after the ACLs return NEEDS_USERNAME, the squid proxy-auth code has been changed to not return a failure code if the password was not accepted. Instead we save some internal state, and only check this state if an authentication filter is returned later.

It is worth noting that in non-transparent mode squid can proxy and authenticate http, gopher, ftp and wais URLs.

In the Proxy

The proxy will make two calls to the ACLs. The first will be:

```
int scc_is_service_allowed(
    unsigned long service_number,
    struct sockaddr_in *src_ip,
    struct sockaddr_in * dst_ip,
    char *src_host_name,            /* usually null */
    char *dst_host_name,            /* usually null */
    char *user_name,                /* null if none */
    int name_valid,                 /* tell if name is valid */
    /* return values */
    int &to_region;
    int &from_region;
    int &filter_text_len,
    char &filter_text,
    int rule_name_len,
    char &rule_name,
    struct sockaddr_in &redirect_src_addr_port,
    struct sockaddr_in &redirect_dst_addr_port,
    int &master_key,
    caddr_t &connection_id          /* id for this connection */
);
```

The possible return values will be:
define ACL_DENY 0
define ACL_ALLOW_HIDE_SRC 1
define ACL_ALLOW_HIDE_DST 2
define ACL_ALLOW_HIDE_BOTH 3
define ACL_ALLOW_SHOW_ALL 4
define ACL_RESOLVE_SRC_ADDR 5
define ACL_RESOLVE_DST_ADDR 6
define ACL_NEED_MORE_FILTER_SPACE 7
define ACL_NEED_USER_NAME 8

Thus the ACLs will return, for each connection, how to hide the addresses. The description of each of these values is as follows:

service_number: this is a number that the backend decides and is unique per service or possibly per service, from and to region triplet as desired.

src_ip: this is the source IP address of the connection.

dst_ip: this is the destination IP address of the connection.

src_host_name: this is the host name based on the reverse lookup of the source address of the connection. This is generally only used when the kernel explicitly asks for it by returning from a previous call to scc_is_service_allowed with a return value of ACL_RESOLVE_SRC_ADDR.

dst_host_name: this is the host name based on the reverse lookup of the destination address of the connection. This is generally only used when the kernel explicitly asks for it by returning from a previous call to scc_is_service_allowed with a return value of ACL_RESOLVE_DST_ADDR.

user_name: this is the user name of the person using the service. This value is only used when ACL_NEED_USER_NAME has been returned by the kernel. Use NULL, if the name has not yet been requested. Currently only FTP, telnet and WWW support user names.

name_valid: this tells the ACLs whether or not a user name makes any sense for this protocol. If the name_valid flag is set to TRUE, then user decision nodes will be used (and thus a user name will be required if a user decision node is encountered when checking the ACL). If set to false, then the user decision nodes will be ignored and the true path of those nodes encountered when checking the ACL will be used.

to_region: the region number that the destination address of this connection is in.

from_region: the region number that the source address of this connection is in.

filter_text_len: this is a pointer to an integer which has the length of the filter_text array in it. This value will be set to the amount of data returned by the access call on return. If the return value is ACL_NEED_MORE_FILTER_SPACE, then the value in this variable will contain the amount of space required.

filter_text: this is an array of characters of size filter_text_len which will be used to store the concatenated filter strings accumulated while checking the ACLs.

rule_name_len: this is the size of the array rule_name.

rule_name: this is the name of the rule that allowed or denied the connection. Only a maximum of rule_name_len—1 characters will be stored in there.

redirect_dst_addr_port: this is the address and port to redirect this connection to. The system will set this to all zeroes if it is not in use. The port and address will always both be set together in this structure if it is to be used. Only the sin_port and sin_addr part of the structure will be used.

redirect_src_addr_port: this is used to indicate to the firewall that when making the connection from the firewall to the destination, it should use the source address/port provided. Note that unlike the redirect_dst_addr_port field only the parts of the address required will be filled out. In particular, if the port is specified but not the address then the address field will be zero. Similarly, if the address is specified but not the port, then the port will be zero. For the redirect_dst_addr_port, if one or both field are specified then they are both returned (with the unspecified field left the same as the actual destination).

master_key: this is the key that indicates which items have been licensed on the firewall.

connection_id: this is the connection id for this connection. When the service is finished you provide this id to the scc_service_done system call and that function decrements the correct counters.

Note that the user name will be used by the system to get the groups automatically behind the scenes in the library call. This means that the actual call to the kernel will have more fields. In particular, there will be a list of group names and a counter to indicate how many elements are in the list.

The second call will be:
int scc_service_done(caddr_t connection_id);

This call always returns zero now. The kernel will use the information in the proc structure for this process to decrement the connection counts for this connection.

There is one other call that a proxy might have to make. When an ACL is updated, proxies have to recheck their connections to see if they can still make the connection. This is done as follows:

```
int scc_recheck_service(
    unsigned long service_number,
    struct sockaddr_in *src_ip,
    struct sockaddr_in *dst_ip,
    char *src_host_name,            /* usually null */
    char *dst_host_name,            /* usually null */
    char *user_name,                /* null if none */
    int name_valid,                 /* tell if name is valid */
    caddr_t &connection_id          /* id for this connection */
    /* return values */
    int &to_region;
    int &from_region;
    int &filter_text_len
    char &filter_text,
    int rule_name_len,
    char &rule_name,
```

-continued

```
    struct sockaddr_in &redirect_src_addr_port,
    struct sockaddr_in &redirect_dst_addr_port,
    int &master_key
    );
```

Returns from this will be the same as for the scc_is_service_allowed call except that connection_id is passed in as a parameter not a return value.

If the connection is not allowed, then the counters are automatically freed up and the proxy need not make any further calls for that connection. In the case of counter nodes, the recheck will fail until the counter is at an acceptable level. This means that, if the counter has been decreased below current connection levels, the first connection rechecked will fail and so on until the current number of connections counter has been decremented enough. Thus, proxies should recheck services in order of lowest priority to highest priority (typically by checking the oldest sessions first, when that is possible). Note that short-lived proxies and servers started by secured cannot guarantee the order in which ACLs will be rechecked, since they will all get a HUP signal at the same time.

Implementation of Regions

The following new system calls were added to BSDI 3.1 version of UNIX to support regions:

| | |
|---|---|
| rgnbind() | allows a service on the firewall to listen for network connections only in the specified region. This allows us to have different programs listening in different regions; for example, a caching WWW proxy for connections from internal to external and a non-caching proxy from SSN to external. In one embodiment, network servers were modified to use rgnbind() instead of bind(), to ensure that they handled traffic for the correct region. |
| rgnctl() | adds, deletes, and modifies regions and sets per-region parameters: Members, router, connection refused, and ping response. |
| rrctl() | sets region-to-region policy. Currently only handles network address translation, but could add other parameters in future. |
| scc_getregion() | retrieve the region number for a given IP address |
| scc_service_checks() | |
| scc_backend_acl_calls() | |
| scc_service_done() | |
| scc_get_service_counts() | |

Other changes include:
  initialization of region table at system startup time;
  addition of a region number to the packet header data structure to record the region ID for every network packet received;
  addition of a field to the network interface data to record which region that interface belongs to; and
  addition of a field to the VPN security association data to record which region the VPN is belongs to.
Other further changes:
  In the ICMP (Internet Control Message Protocol) processing, if the incoming packet is an ICMP ECHO_REQUEST (commonly known as a "ping"), check the region table and only respond if ping response is enabled for the region from which the packet came;
  In the IPSec key and policy processing code, code was added to record the region ID associated with keys and policy table entries, and to manipulate keys and policies on a region-by-region basis;

List of changed files: Region modifications were made to the following files within the BSD/OS kernel:

| | |
|---|---|
| kern/uipc_mbuf.c | netpolicy/pt_debug.c |
| kern/uipc_syscalls.c | netpolicy/ptsock.c |
| ACL/aclservice.c | netpolicy/policy.c |
| netinet/ip_input.c | netsec/ipsec.c |
| netinet/in_pcb.c | netsec/ipsec_ah.c |
| netinet/in_pcb.h | netsec/ipsec_esp.c |
| netinet/ip_icmp.c | sys/aclkern.h |
| netinet/ip_tunnel.c | sys/audit_codes.h |
| netinet/raw_ip.c | sys/mbuf.h |
| netinet/tcp_input.c | sys/region.h |
| netinet/udp_usrreq.c | sys/sysctl.h |
| netkey/key.c | net/if.c |
| netpolicy/policy.h | net/if.h |

Region Determination Processing

Figure 5:
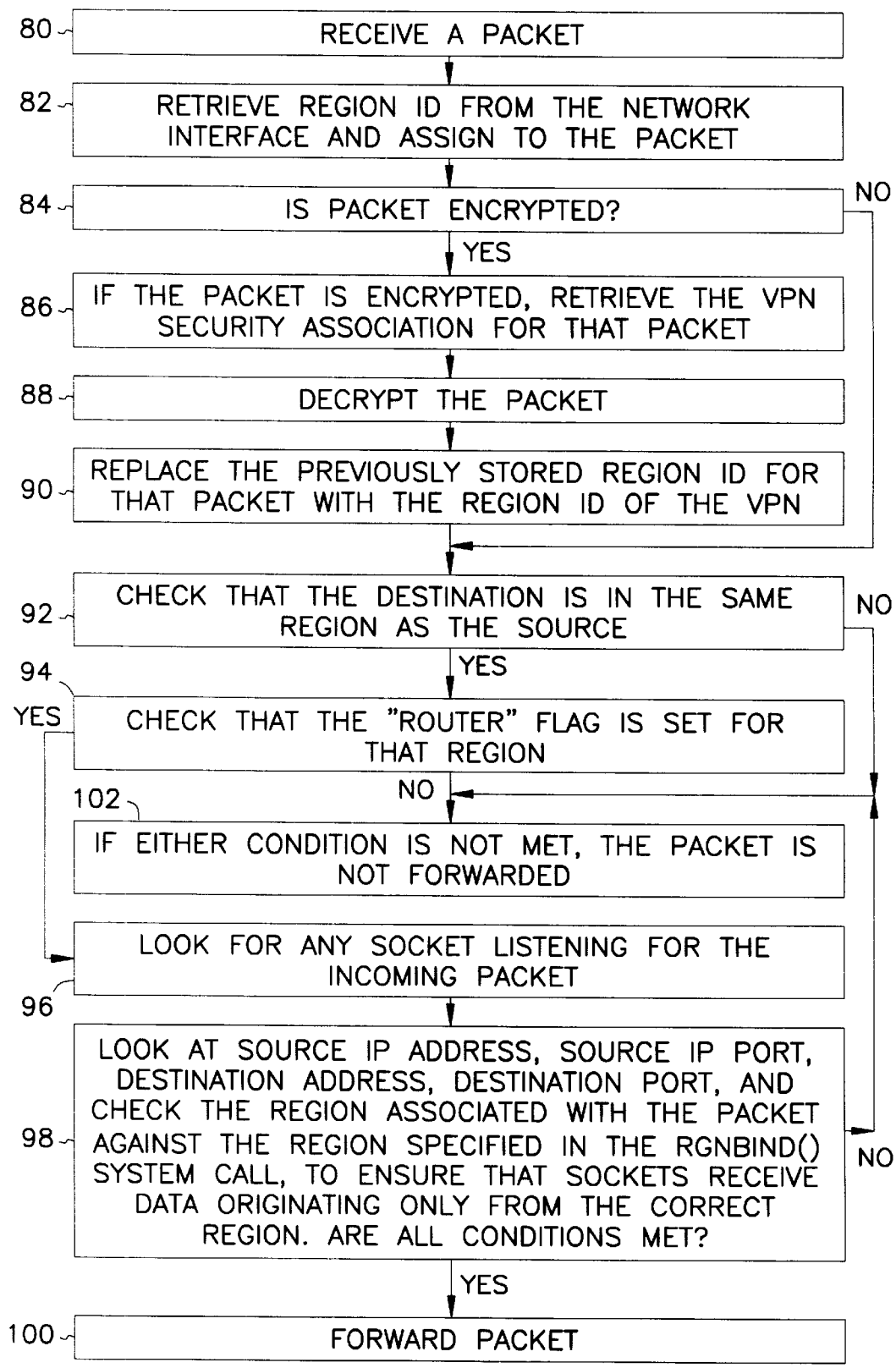
FIG. 5 depicts a method by which incoming data packets are processed in accordance with the present invention.

Referring to FIG. 5, when a packet is received as shown in step 80, the region ID is retrieved from the network interface and assigned to the packet in step 82. It is determined in step 84 whether the packet is encrypted, i.e., a VPN. If the packet is encrypted, processing proceeds to step 86 where the VPN security association for that packet is retrieved. The packet is then decrypted in step 88, and the previously stored region ID for that packet is replaced with the region ID of the VPN in step 90. All further operations take place on the decrypted packet.

Ordinarily, a UNIX system then checks whether the packet is destined for one of the firewall's IP addresses. If not, the packet is forwarded to the real destination. This has been modified in SecureOS to check that: (a) the destination is in the same region as the source and (b) the "router" flag is set for that region, as shown in steps 92 and 94. If either condition is not met, the packet is not forwarded, as shown in step 102.

In step 96, the system looks for any socket listening for the incoming packet. Traditionally this match looks at source IP address, source IP port, destination address, and destination port. This has been extended in SecureOS, as shown in step 98, to also check the region associated with the packet against the region specified in the rgnbind() system call, to ensure that sockets receive data originating only from the correct region. If all conditions are met, the packet is forwarded in step 100; otherwise, the packet is not forwarded (step 102).

Examples of User's View of Regions:

This example mimics the Borderware configuration of internal, external, and Secure Server Net (SSN):

| Name | Members | We show address to | We see address from | Rtr | Conn | Ping |
|---|---|---|---|---|---|---|
| Internal | ef0 Ethernet VPN-Waterloo | | External SSN | 1 | 1 | 1 |
| External | ef1 Ethernet | Internal SSN | | 0 | 0 | 0 |
| SSN | ef2 Ethernet | Internal | External | 1 | 1 | 1 |

The fields are:

| | |
|---|---|
| Name | user specified region name |
| Members | physical interfaces and VPN encrypted connections that belong to this region. |
| We Show Addr To | the Network Address Translation configuration. This example shows that the Internal region is hidden from all others, and that the SSN region is hidden from External but visible to Internal |
| We See Addr From | |
| Rtr | if 1, the firewall acts as a router between members of this region. In this example, packets would flow between the Internal region and the VPN to Waterloo as if they were simply going through a router. |
| Conn | If 1, the firewall returns "connection refused" messages if there is no service available on the requested network port. Setting this to 0 on external regions can help defeat network scanning attacks. |
| Ping | Respond to network pings (ICMP ECHO-REQUEST packets). Again, setting to 0 on external regions can help defeat network scans. |

The following example shows a region of the firewall of the present invention configured to sit between two departments of a company and transparently filter and control network access between the departments.

| Name | Members | We show address to | We see address from | Rtr | Conn | Ping |
|---|---|---|---|---|---|---|
| Service | ef0 Ethernet | Research | Research | 1 | 1 | 1 |
| Research | ef1 Ethernet | Service | Service | 1 | 1 | 1 |

The two regions can see each others' addresses; that is, no address translation is done. Nevertheless, network connections are only allowed if an access rule on the firewall grants permission.

Conclusion

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of achieving network separation within a computing system having network interfaces connected to form a plurality of physical networks, the method comprising the steps of:

defining a plurality of regions;
   defining a virtual private network;
   establishing a set of security policies, wherein the set of security policies defines rules for communicating between each of the plurality of regions;
   assigning each physical network to one of the plurality of regions;
   assigning the virtual private network to one of the plurality of regions; and
   restricting communication between the plurality of regions in accordance with the set of security policies.

2. The method according to claim 1, wherein establishing a set of security policies includes defining an access rule for communication between two regions.

3. The method according to claim 2, wherein the access rule establishes permissions for use of a communication path between the source and destination regions.

4. The method according to claim 2, wherein the access rule establishes one or more constraints on use of a communication path between the source and destination regions.

5. The method according to claim 4, wherein the constraints include an encryption requirement.

6. The method according to claim 4, wherein the constraints include an authentication requirement.

7. The method according to claim 4, wherein the constraints include a constraint from a group of constraints including a time of day restriction, a concurrent sessions restriction, connection redirection, an address restriction, a host name restriction and a user restriction.

8. The method according to claim 1, wherein restricting communication includes routing communication between different regions to an application level proxy, wherein the application level proxy applies the set of security policies.

9. A secure server, comprising:
   an operating system kernel;
   a plurality of network interfaces, wherein the network interfaces are connected to form a plurality of physical networks and wherein each of the plurality of network interfaces communicates with the operating system kernel;
   a virtual private network;
   a plurality of regions; and
   a security policy, wherein the security policy defines rules for communicating between each of the plurality of regions;
   wherein each of the physical networks is assigned to a region;
   wherein the virtual private network is assigned to a region; and
   wherein communication between the plurality of regions is restricted in accordance with the security policy.

10. The secure server according to claim 9, wherein the security policy uses an access rule to restrict communication between two regions and wherein communication between a source and destination region is only allowed if an access rule has been defined for communication from the source region to the destination region.

11. The secure server according to claim 10, wherein the access rule establishes permissions for use of a communication path between the source and destination regions.

12. The secure server according to claim 10, wherein the access rule establishes one or more constraints on use of a communication path between the source and destination regions.

13. The secure server according to claim 12, wherein the constraints include an encryption requirement.

14. The secure server according to claim 12, wherein the constraints include an authentication requirement.

15. The secure server according to claim 12, wherein the constraints include a constraint from a group of constraints including a time of day restriction, a concurrent sessions restriction, connection redirection, an address restriction, a host name restriction and a user restriction.

16. The secure server according to claim 10, wherein the secure server further comprises an application level proxy and wherein communication between regions is first examined by the application level proxy.

17. The secure server according to claim 10, wherein the secure server further comprises an application level proxy and wherein communication between regions is first examined by the application level proxy.

18. In a computer system having a plurality of network interfaces, including a first and a second network interface, in which the first and second network interfaces are connected to first and second networks, respectively, a method of processing a packet having a source region and a destination region, the method comprising:
   defining a plurality of regions, wherein defining includes assigning a first region identifier to the first network and a second region identifier to the second network;
   establishing a security policy, wherein the security policy defines rules for communicating between the plurality of regions;
   receiving a packet at the first network interface;
   assigning the first region identifier to the packet;
   reviewing the security policy to determine if transfer of the packet between the source region and the destination region is permitted for packets assigned the first region identifier; and
   if so, forwarding the packet to the destination region.

19. The method according to claim 18 wherein reviewing the security policy includes issuing a mgbind() system call to ensure that sockets receive data only from a predefined region.

20. In a computer system having a plurality of network interfaces, including a first and a second network interface, in which the first and second network interfaces are connected to first and second networks, respectively, a method of processing a packet having a source region and a destination region, the method comprising:
   providing a virtual private network;
   defining a plurality of regions, wherein defining includes assigning a first region identifier to the first network, a second region identifier to the second network and a third region identifier to the virtual private network;
   establishing a security policy, wherein the security policy defines rules for communicating between the plurality of regions;
   receiving a packet at the first network interface;
   assigning the first region identifier to the packet;
   determining if the packet is encrypted;
   if the packet is encrypted, changing the region identifier assigned to the packet, wherein changing the region identifier includes:
      retrieving a virtual private network security association for the packet;
      decrypting the packet; and
      replacing the first region identifier with the third region identifier;
   reviewing the security policy to determine if transfer of the packet between the source region and the destination region is permitted when the packet is received from the virtual private network; and
   if so, forwarding the packet to the destination.

21. The method according to claim 20 wherein reviewing the security policy includes issuing a mgbind() system call to ensure that sockets receive data only from a predefined region.

22. A method of achieving network separation within a computing system having a plurality of networks, including a virtual private network, the method comprising the steps of:
   defining a plurality of regions;
   configuring a set of security policies, wherein the set of security policies defines rules for communicating between each of the plurality of regions;
   assigning each of the plurality of networks to one of the plurality of regions, wherein assigning includes assigning a region identifier to the virtual private network; and
   restricting communication between regions in accordance with the set of security policies.

23. The method according to claim 22, wherein establishing a set of security policies includes defining an access rule for communication between two regions.

24. The method according to claim 23, wherein the access rule establishes permissions for use of a communication path between the two regions.

25. The method according to claim 23, wherein the access rule establishes one or more constraints on use of a communication path between the two regions.

26. The method according to claim 23, wherein the constraints include a constraint from a group of constraints including an encryption requirement, an authentication requirement, a time of day restriction, a concurrent sessions restriction, connection redirection, an address restriction, a host name restriction and a user restriction.

27. The method according to claim 22, wherein restricting communication includes routing communication between different regions to an application level proxy, wherein the application level proxy applies the set of security policies.

28. In a computer network system having a plurality of regions and a plurality of services, including a first service, wherein each service defines a protocol for transferring data between two of the plurality of regions, and wherein each region includes one or more networks, a method of limiting transfers between regions, comprising:
   defining a to-from set, wherein the to-from set lists a source region and a destination region;
   associating the to-from set with the first service;
   defining a path, wherein the path includes desired options for limiting transfer from the source region to the destination region via the first service;
   storing information regarding the to-from set, the first service and the path as an access control rule;
   receiving a request to set up said first service between the source region and the destination region;
   comparing the request to the access control rule to determine access; and
   if access is allowed, establishing the service between the source and destination regions.

29. A method of achieving network separation within a computing system having network interfaces connected to form a plurality of physical networks, the method comprising the steps of:
   defining a plurality of regions;
   establishing a set of security policies, wherein the set of security policies defines rules for communicating between each of the plurality of regions;

assigning each physical network to one of the plurality of regions, wherein at least one of the regions is assigned two or more networks; and restricting communication between the plurality of regions in accordance with the set of security policies.

30. The method according to claim 29, wherein establishing a set of security policies includes defining an access rule for communication between two regions.

31. A secure server, comprising:

an operating system kernel;

a plurality of network interfaces, wherein the network interfaces are connected to form a plurality of physical networks and wherein each of the plurality of network interfaces communicates with the operating system kernel;

three or more regions; and a security policy, wherein the security policy defines rules for communicating between each of the plurality of regions;

wherein each of the physical networks is assigned to a region;

wherein at least one of the regions has two or more networks assigned to that region; and wherein communication between the plurality of regions is restricted in accordance with the security policy.

32. The secure server according to claim 31, wherein the security policy uses an access rule to restrict communication between two regions and wherein communication between a source and destination region is only allowed if an access rule has been defined for communication from the source region to the destination region.

* * * * *

UNITED STATES PATENT AND TRADEMARK OFFICE
CERTIFICATE OF CORRECTION

PATENT NO.   : 6,182,226 B1
DATED         : January 30, 2001
INVENTOR(S)  : Reid et al.

It is certified that error appears in the above-identified patent and that said Letters Patent is hereby corrected as shown below:

Column 1,
Line 54, after "invention" delete "is".

Column 8,
Line 65, after "firewall" insert -- is --.

Column 9,
Line 31, delete "itjust" and insert -- it just --, therefor.
Line 43, after "calls." delete the paragraph break.

Column 10,
Line 16, delete "i...d" and insert -- i---d --, therefor.

Column 11,
Line 36, delete "DELB" and insert -- DELE --, therefor.
Line 40, delete "pfsN" and insert -- pfSN --, therefor.

Column 14,
Line 13, delete "len— 1" and insert -- len-1 --, therefor.

Column 15,
Line 57, delete after "VPN" delete "is".

Column 19,
Line 35, delete "mgbind()" and insert -- rngbind() --, therefor.

UNITED STATES PATENT AND TRADEMARK OFFICE
CERTIFICATE OF CORRECTION

PATENT NO. : 6,182,226 B1
DATED : January 30, 2001
INVENTOR(S) : Reid et al.

It is certified that error appears in the above-identified patent and that said Letters Patent is hereby corrected as shown below:

Column 20,
Line 3, delete "mgbind()" and insert -- rngbind() --, therefor.

Signed and Sealed this

Twenty-third Day of July, 2002

Attest:

Attesting Officer

JAMES E. ROGAN
Director of the United States Patent and Trademark Office